No. 760,565. PATENTED MAY 24, 1904.
W. J. RICHARDS.
ELECTRICAL SWITCHING APPARATUS.
APPLICATION FILED APR. 29, 1903.
NO MODEL. 2 SHEETS—SHEET 2.
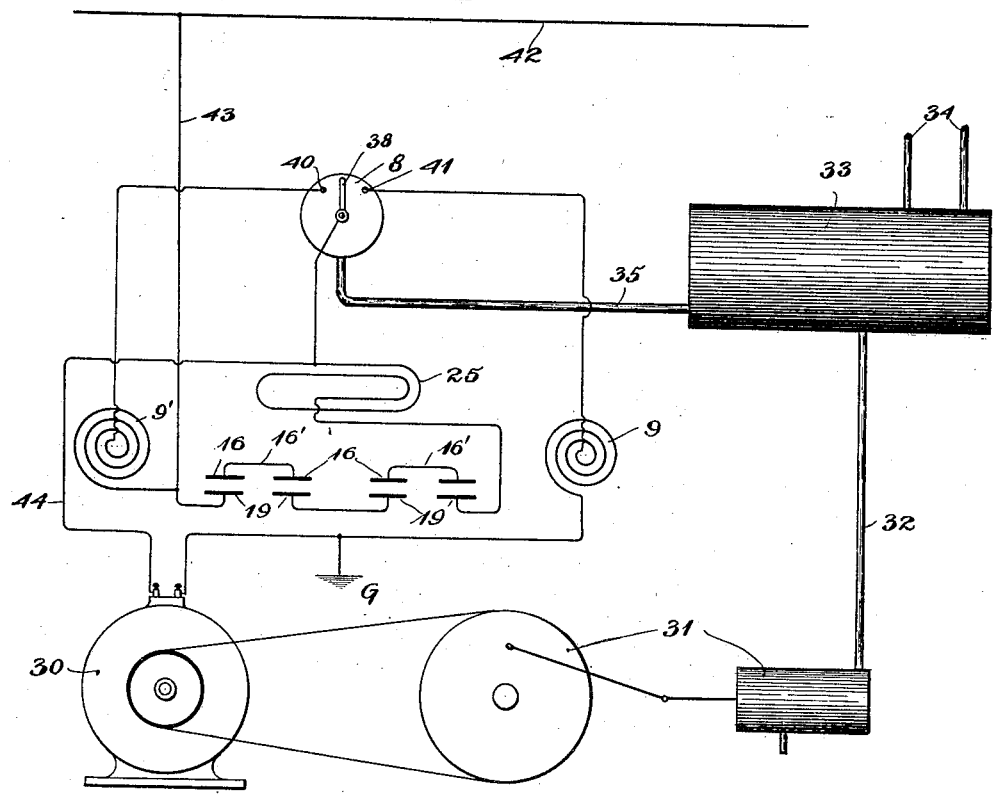
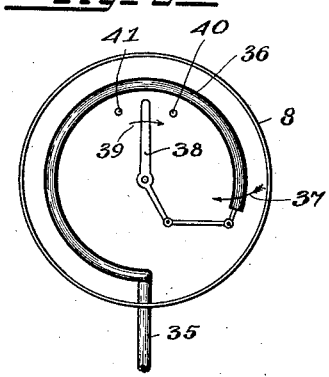
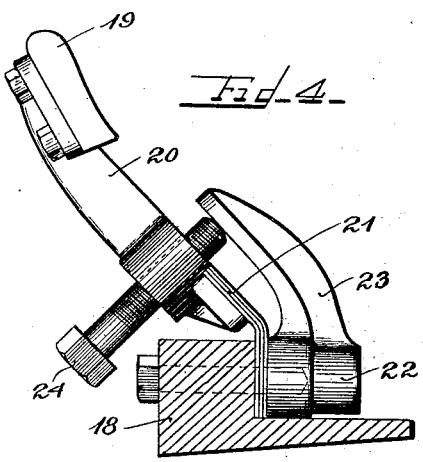
Witnesses
Charles J. Schmidt
Lynn A. Williams
Inventor
Walter J. Richards
By Charles A. Brown
Attorney No. 760,565. Patented May 24, 1904.

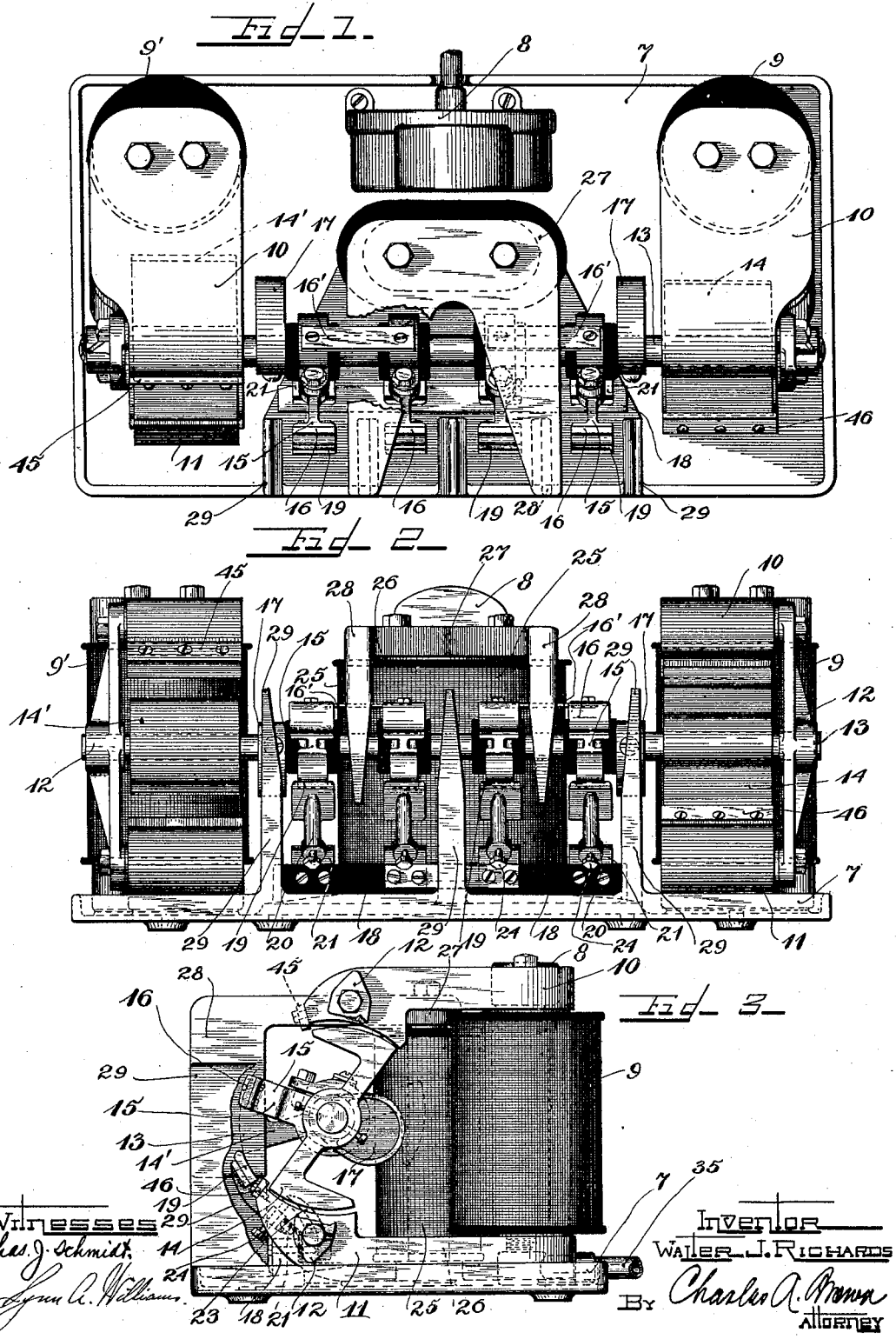

UNITED STATES PATENT OFFICE.

WALTER J. RICHARDS, OF MILWAUKEE, WISCONSIN.

ELECTRICAL SWITCHING APPARATUS.

SPECIFICATION forming part of Letters Patent No. 760,565, dated May 24, 1904.

Application filed April 29, 1903. Serial No. 154,802. (No model.)

*To all whom it may concern:*

Be it known that I, WALTER J. RICHARDS, a citizen of the United States, residing at Milwaukee, in the county of Milwaukee and State of Wisconsin, have invented a certain new and useful Improvement in Electrical Switching Apparatus, (Case No. 2,) of which the following is a full, clear, concise, and exact description, reference being had to the accompanying drawings, forming a part of this specification.

My invention relates to electrical switching apparatus, and is particularly adapted for use in conjunction with installations where the electrical circuits are governed and controlled by the operative condition of devices operated by an electric motor.

A particularly advantageous use of my invention may be made in connection with air-compressing machinery in which the compressor is driven by an electric motor, the air from the compressor being stored in a storage reservoir or tank, from which the supply is drawn as needed. In such installations it is desirable that the pressure of air in the storage-tank be maintained substantially constant. This result may be attained by using an electric motor for driving the compressor, the control of the electric motor being governed by automatic mechanism effected by the air-pressure in the storage-tank.

A preferred embodiment of my present invention comprises switch-contacts, some of which are mounted upon a rotatable shaft, while others are stationarily mounted and adapted to make connection with those contacts which are mounted upon the rotatable shaft. The partial rotation of the shaft necessary in order to make or break electrical connections may be caused by suitable armatures mounted rigidly upon the shaft, which are actuated upon the energization of suitable electromagnets. The circuits through the electromagnets, which actuate the armatures one in one direction and one in the reverse direction, are controlled by a switching device whose operative condition is governed by the pressure of the air within the storage-tank of the system. There is provided in connection with the switch-contacts a magnetic blow-out adapted to suppress arcing or sparking when breaking electrical connections between the switch-contacts. A desirable arrangement for governing the circuits in accordance with the air-pressure in the storage-tank comprises a well-known Bourdon pressure-gage, which is provided with a switch-arm in place of the usual indicating-needle. This switch-arm is adapted to move over suitable contact-points which are connected with circuits through the electromagnets which control the actuation of the armatures associated with the movable switch-blades.

My invention will be understood by reference to the accompanying drawings, in which—

Figure 1 is a plan view of a switching device constructed in accordance with my invention. Fig. 2 is a side elevation of the same. Fig. 3 is an end elevation thereof. Fig. 4 is an end elevation of certain details of the switching mechanism, to be hereinafter more fully described. Fig. 5 is a more or less diagrammatic illustration of the Bourdon pressure-governed switching mechanism employed, and Fig. 6 is a diagrammatic representation of the manner in which my invention may be employed.

Referring more particularly to Figs. 1 to 4, inclusive, I have shown a base-plate 7, upon which is mounted the controlling-gage 8, the details of which are more particularly shown in Fig. 5. There is mounted at either end of the frame 7 an electromagnet comprising in one instance a coil 9 and in the other instance a coil 9', within each of which a core magnetically connects the pole-pieces 10 10 and 11 11. Bolted to the pole-pieces at both ends of the device are yokes 12, in each of which a bearing is provided for the rotatable shaft 13. Upon this shaft is rigidly mounted at one end an armature 14 and at the other end an armature 14', adapted to rotate between the pole-pieces 10 10 and 11 11, as shown. The periphery of these armatures is preferably concentric with points eccentric with respect to the shaft 13. This provides an armature in which the attraction of the pole-pieces is maintained substantially constant during a considerable swing of the armature.

Upon the shaft 13 are secured switch-arms 15 15, to the outer ends of which are bolted the contact-pieces 16 16, the contact-arms being insulated from the shaft 13 by bushings of insulating material, such as hard maple. One or more counterweights 17 are secured to the shaft 13 to counterbalance the weight of the switch-arms 15 and the contact-plates 16. There is provided upon the base-plate a strip of hard maple 18, to which are fastened stationary contact-pieces and their adjusting and supporting mechanisms. These parts are best illustrated in Fig. 4, which illustrates in side elevation one of the stationary contact-pieces 19 and its supporting-finger 20, which is secured to the strip 18 through the interposition of a spring 21. A terminal 22, to which the necessary conductors may be fastened, is provided with an upwardly-extending projection 23, which is engaged by the adjusting-screw 24, by which the position of the contact-piece 19 may be made such as to permit a good rubbing contact with the movable pieces 16 associated therewith. The contact-pieces 16 are connected together by bars 16', as best illustrated in diagrammatic Fig. 6. In order to extinguish any arc that may be formed upon interrupting the circuit through the closed contact-pieces, there is provided an electromagnet having a winding 25 upon a core 26, extending between the base-plate of the frame 7 to an overhanging pole-piece 27, from which depend the two projections 28 28, these projections being interposed between upwardly-extending projections 29, which may be cast integrally with the iron base-plate, as shown. An energization of the electromagnet due to a flow of current through the coil 25 causes a strong magnetic flux between the adjacent projections 28 and 29, which magnetic flux causes a rapid extinction or blowout of any arc that may be formed upon the disruption of the circuit between the movable and stationary contact-pieces. A circuit arrangement which may desirably be employed in connection with this switching device is diagrammatically illustrated in Fig. 6, where I have shown an electric motor 30 belted to the compressor 31, from the cylinder of which a pipe 32 leads to a storage-tank 33. The pipes 34 34 lead to pneumatically-operated devices of any kind whatsoever. A small pipe 35 leads from the storage-reservoir 33 to the gage-switch 8, (illustrated in Fig. 5,) in which the tube 36 is shown connected with the pipe 35, whereby a decrease in the pressure within the reservoir causes a movement of the free end of the tube in the direction indicated by the arrow 37, thereby causing a rotation of the switch-arm 38 in the direction indicated by the arrow 39. There are provided a pair of switch-contacts 40 and 41, the contact of the switch-arm with terminal 40 serving to close an electric circuit through the electromagnet-coil 9', which circuit may be traced as follows: from the line or trolley wire 42, through the conductor 43, the electromagnet-coil 9', the gage-terminal 40, the switch-arm 38, the conductor 44, the motor 30, to the ground G, an electric generator (not shown) having its terminals connected one to the line-wire 42 and the other to the ground G. A movement of the switch-arm 38 into contact with the terminal 41 closes a circuit which may be traced as follows: from the line 42, through the conductor 43, the switch-contact pieces 16 and 19, the electromagnet-winding 25, the switch-arm 38, the terminal 41, the electromagnet-coil 9, to the ground G.

The operation of a controller constructed in accordance with my invention may be described as follows: The withdrawal of air from the reservoir 33 through the pipes 34 causes a drop in the pressure within the reservoir, causing a corresponding movement of the switch-arm 38 to make contact with the terminal 40, whereby the circuit is closed through the coil 9'. As best illustrated in Fig. 3, the armatures 14 and 14' are placed at an angle one with the other such that the closure of a circuit through the coil 9' and the consequent energization of the associated pole-pieces causes an attraction of the armature 14' to cause a partial rotation of the shaft 13 and the associated parts to make contact between the contact-pieces 16 and 19, thereby closing the circuit through the motor 30. This circuit is traced as follows: from the ground G, through the motor 30, the coil 25, the switch contact-pieces 19 and 16, and the conductor 43 to the line 42 and thence back to the generator connected with the ground G. The movement of the armature 14' is desirably limited by the stop 45, which is secured to the pole-piece of the electromagnet, as shown. The motor 30 is thus caused to operate, whereby the compressor 31 is driven to supply compressed air to the reservoir 33, thus increasing the pressure in this reservoir to such an extent that the switch-arm 38 is brought into contact with the terminal 41, whereby a circuit is closed through the electromagnet-winding 9, causing an energization of its associated pole-pieces to actuate the armature 14, the armature being thereupon swung into the position shown in Fig. 3, thus causing a movement of the contact-pieces 16 to cause a break in the circuit previously traced therethrough. The circuit through the motor 30 included the switch contact-pieces 16 and 19, and these contacts being separated there is caused a break in the motor-circuit, whereupon the motor is brought to rest. The undesirable arcing or sparking which would otherwise occur between the contacts 16 and 19 is largely avoided by the strong magnetic flux between the projections 28 and 29 due to the energization of the coil 25. As in the case of the armature 14', there is also provided for the armature 14 a stop 46, secured to the pole-tip 11.

It will be seen that my invention provides means whereby the control of an electrically-driven air-compressor may be governed to maintain a constant pressure in the reservoir supplied thereby.

While I have herein shown and described one embodiment of my invention, it will be apparent to those skilled in the art that many modifications may be employed without departing from the spirit thereof, and I do not wish, therefore, to limit myself to the precise disclosure herein set forth; but, Having described my invention, I claim as new and desire to secure by Letters Patent—

1. In a device of the class described, the combination with a base-plate, of two electromagnets having projecting pole-pieces mounted on said base-plate, an armature for each of said electromagnets, a common shaft carrying said armatures, a plurality of contact-pieces mounted on said shaft, and a plurality of stationary contact-pieces, the disposition of the pole-pieces of said electromagnets and of said armatures being such that the energization of one of said electromagnets causes a rotation of said shaft to cause an electrical connection between said movable and said stationary contact-pieces while an energization of the other electromagnet causes a rotation of said shaft to cause a break in the connection between said contact-pieces.

2. In a device of the class described, the combination with a base-plate, of two electromagnets having projecting pole-pieces mounted on said base-plate, an armature for each of said electromagnets, a common shaft carrying said armatures, a plurality of contact-pieces mounted on said shaft, a plurality of stationary contact-pieces, the disposition of the pole-pieces of said electromagnets and of said armatures being such that the energization of one of said electromagnets causes a rotation of said shaft to cause an electrical connection between said movable and said stationary contact-pieces, while an energization of the other electromagnet causes a rotation of said shaft to cause a break in the connection between said contact-pieces, and an electromagnet having pole-pieces of opposite polarity, one on either side of each of said stationary contact-pieces.

3. In combination, an electric motor, an air-compressor driven thereby, a pneumatic-pressure system supplied by said compressor, two electromagnets having projecting pole-pieces, an armature for each of said electromagnets, a common shaft carrying said armatures, a contact-piece mounted on said shaft, a stationary contact-piece, the electric current for the operation of said motor being controlled by said contact-pieces, and means whereby a decrease in the pressure in said pneumatic-pressure system to a minimum limit causes the closure of an electric circuit through one of said electromagnets to cause a rotation of said shaft to make an electrical connection between said contact-pieces to close an electric circuit through said motor.

4. In combination, an electric motor, an air-compressor driven thereby, a pneumatic-pressure system supplied by said compressor, two electromagnets having projecting pole-pieces, an armature for each of said electromagnets, a common shaft carrying said armatures, a contact-piece mounted on said shaft, a stationary contact-piece, the electric current for the operation of said motor being controlled by said contact-pieces, means whereby a decrease in the pressure in said pneumatic-pressure system to a minimum limit causes the closure of an electric circuit through one of said electromagnets to cause a rotation of said shaft to make an electrical connection between said contact-pieces to close an electric circuit through said motor, and means whereby an increase in the pneumatic pressure to a maximum limit causes the closure of an electric circuit through the other of said electromagnets to cause a reverse rotation of said shaft to break the electrical connection between said contact-pieces to open the electric circuit through said motor.

5. In combination, an electric motor, an air-compressor driven thereby, a pneumatic-pressure system supplied by said compressor, two electromagnets having projecting pole-pieces, an armature for each of said electromagnets, a common shaft carrying said armatures, a plurality of contact-pieces mounted on said shaft, a plurality of stationary contact-pieces, the electric current for the operation of said motor being controlled by a serial connection through said contact-pieces, means whereby a decrease in the pressure in said pneumatic-pressure system to a minimum limit causes the closure of an electric circuit through one of said electromagnets to cause a rotation of said shaft to make an electrical connection between said contact-pieces to close an electric circuit through said motor, and means whereby an increase in the pneumatic pressure to a maximum limit causes the closure of an electric circuit through the other of said electromagnets to cause a reverse rotation of said shaft to break the electrical connection between said contact-pieces to open the electric circuit through said motor.

6. In combination, an electric motor, an air-compressor driven thereby, a pneumatic-pressure system supplied by said compressor, two electromagnets having projecting pole-pieces, an armature for each of said electromagnets, a common shaft carrying said armatures, a contact-piece mounted on said shaft, a stationary contact-piece, the electric current for the operation of said motor being controlled by said contact-pieces, means whereby a decrease in the pressure in each pneumatic-pressure system to a minimum limit causes the closure of an electric circuit through one of said electromagnets to cause a rotation of said shaft to make an electrical connection between said contact-pieces to close an electric circuit through said motor, and means for producing a magnetic field at the place of rupture in the motor-circuit to blow out the electric arc produced.

7. In combination, an electric motor, an air-compressor driven thereby, a pneumatic pressure system supplied by said compressor, two electromagnets having projecting pole-pieces, an armature for each of said electromagnets, a common shaft carrying said armatures, a contact-piece mounted on said shaft, a stationary contact-piece, the electric current for the operation of said motor being controlled by said contact-pieces, means whereby a decrease in the pressure in said pneumatic-pressure system to a minimum limit causes the closure of an electric circuit through one of said electromagnets to cause a rotation of said shaft to make an electrical connection between said contact-pieces to close an electric circuit through said motor, means whereby an increase in the pneumatic pressure to a maximum limit causes the closure of an electric circuit through the other of said electromagnets to cause a reverse rotation of said shaft to break the electrical connection between said contact-pieces to open the electric circuit through said motor, and means for producing a magnetic field at the place of rupture in the motor-circuit to blow out the electric arc produced.

8. In combination, an electric motor, an air-compressor driven thereby, a pneumatic-pressure system supplied by said compressor, two electromagnets having projecting pole-pieces, an armature for each of said electromagnets, a common shaft carrying said armatures, a plurality of contact-pieces mounted on said shaft but insulated therefrom, a plurality of stationary contact-pieces, the electric current for the operation of said motor being controlled by a serial connection through said contact-pieces, means whereby a decrease in the pressure in the said pneumatic-pressure system to a minimum limit causes the closure of an electric circuit through one of said electromagnets to cause a rotation of said shaft to make an electrical connection between said contact-pieces to close an electric circuit through said motor, means whereby an increase in the pneumatic pressure to a maximum limit causes the closure of an electric circuit through the other of said electromagnets to cause a reverse rotation of said shaft to break the electrical connection between said contact-pieces to open the electric circuit through said motor, and means for producing a magnetic field at the places of rupture in the motor-circuit to blow out the electric arc produced.

9. In combination, an electric motor, an air-compressor driven thereby, a pneumatic-pressure system supplied by said compressor, two electromagnets having projecting pole-pieces, an armature for each of said electromagnets, a common shaft carrying said armatures, a contact-piece mounted on said shaft, a stationary contact-piece, the electric current for the operation of said motor being controlled by said contact-pieces, means whereby a decrease in the pressure in said pneumatic-pressure system to a minimum limit causes the closure of an electric circuit through one of said electromagnets to cause a rotation of said shaft to make an electrical connection between said contact-pieces to close an electric circuit through said motor, means whereby an increase in the pneumatic pressure to a maximum limit causes the closure of an electric circuit through the other of said electromagnets to cause a reverse rotation of said shaft to break the electrical connection between said contact-pieces to open the electric circuit through said motor, and an electromagnet in circuit with said motor having pole-pieces of opposite polarity one on either side of said stationary contact.

10. In combination, an electric motor, an air-compressor driven thereby, a pneumatic-pressure system supplied by said compressor, two electromagnets having projecting pole-pieces, an armature for each of said electromagnets, a common shaft carrying said armatures, a plurality of contact-pieces mounted on said shaft but insulated therefrom, a plurality of stationary contact-pieces, the electric current for the operation of said motor being controlled by a serial connection through said contact-pieces, means whereby a decrease in the pressure in said pneumatic-pressure system to a minimum limit causes the closure of an electric circuit through one of said electromagnets to cause a rotation of said shaft to make an electrical connection between said contact-pieces to close an electric circuit through said motor, means whereby an increase in the pneumatic pressure to a maximum limit causes the closure of an electric circuit through the other of said electromagnets to cause a reverse rotation of said shaft to break the electrical connection between said contact-pieces to open the electric circuit through said motor, and an electromagnet in circuit with said motor having pole-pieces of opposite polarity one on either side of each of said stationary contacts.

11. In combination, an electric motor, an air-compressor driven thereby, a pneumatic-pressure system supplied by said compressor, two electromagnets having projecting pole-pieces, an armature for each of said electromagnets, a common shaft carrying said armatures, the pole-pieces of said electromagnets being bored concentric with said shaft and the periphery of said armatures being formed eccentric with respect to their axis of rotation, substantially as and for the purpose shown, a contact-piece mounted on said shaft, a stationary contact-piece, the electric current for the operation of said motor being controlled by said contact-pieces, means whereby a decrease in the pressure in said pneumatic-pressure system to a minimum limit causes the closure of an electric circuit through one of said electromagnets to cause a rotation of said shaft to make an electrical connection between said contact-pieces to close an electric circuit through said motor, means whereby an increase in the pneumatic pressure to a maximum limit causes the closure of an electric circuit through the other of said electromagnets to cause a reverse rotation of said shaft to break the electrical connection between said contact-pieces to open the electric circuit through said motor, and an electromagnet in the circuit with said motor having pole-pieces of opposite polarity, one on either side of said stationary contact.

12. In a device of the class described, the combination with a base-plate, of two electromagnets having projecting pole-pieces mounted on said base-plate, an armature for each of said electromagnets, a common shaft carrying said armatures, the pole-pieces of said electromagnets being bored concentric with said shaft and the periphery of said armatures being formed eccentric with respect to their axis of rotation, substantially as and for the purpose shown, a plurality of stationary contact-pieces, the disposition of the pole-pieces of said electromagnets and of said armatures being such that the energization of one of said electromagnets causes a rotation of said shaft to cause an electrical connection between said movable and said stationary contact-pieces, while an energization of the other electromagnet causes a reverse rotation of said shaft to cause a break in the connection between said contact-pieces.

13. In a device of the class described, the combination with a base-plate, of two electromagnets having projecting pole-pieces mounted on said base-plate, an armature for each of said electromagnets, a common shaft carrying said armatures, a plurality of contact-pieces mounted on said shaft, a plurality of relatively stationary contact-pieces, and spring mechanism associated with said contact-pieces adapted to permit a slight movement of said contact-pieces to maintain a firm rubbing contact with said movable contact-pieces when engaged thereby, the disposition of the pole-pieces of said electromagnets and of said armatures being such that the energization of one of said electromagnets causes a rotation of said shaft to cause an electrical connection between said movable and said stationary contact-pieces while an energization of the other electromagnet causes a reverse rotation of said shaft to cause a break in the connection between said contact-pieces.

14. In a device of the class described, the combination with a base-plate, of two electromagnets having projecting pole-pieces mounted on said base-plate, an armature for each of said electromagnets, a common shaft carrying said armatures, a plurality of contact-pieces mounted on said shaft, a plurality of relatively stationary contact-pieces, spring mechanism associated with said contact-pieces adapted to permit a slight movement of said contact-pieces to maintain a firm rubbing contact with said movable contact-pieces when engaged thereby, and means for adjusting said spring mechanism, the disposition of the pole-pieces of said electromagnets and of said armatures being such that the energization of one of said electromagnets causes a rotation of said shaft to cause an electrical connection between said movable and said stationary contact-pieces, while an energization of the other electromagnet causes a reverse rotation of said shaft to cause a break in the connection between said contact-pieces.

15. In a device of the class described, the combination with a base-plate, of two electromagnets having projecting pole-pieces mounted on said base-plate, an armature for each of said electromagnets, a common shaft carrying said armatures, a plurality of contact-pieces mounted on said shaft, a plurality of relatively stationary contact-pieces, spring mechanism associated with said contact-pieces adapted to permit a slight movement of said contact-pieces to maintain a firm rubbing contact with said movable contact-pieces when engaged thereby, means for adjusting said spring mechanism, the disposition of the pole-pieces of said electromagnets and of said armatures being such that the energization of one of said electromagnets causes a rotation of said shaft to cause an electrical connection between said movable and said stationary contact-pieces, while an energization of the other electromagnet causes a reverse rotation of said shaft to cause a break in the connection between said contact-pieces, and an electromagnet having pole-pieces of opposite polarity, one on either side of each of said relatively stationary contact-pieces.

16. In a device of the class described, the combination with two electromagnets having projecting pole-pieces, of an armature for each of said electromagnets, a plurality of movable contact-pieces, said movable contact-pieces and said armatures being relatively fixed and all rotatably mounted, and a plurality of stationary contact-pieces, the disposition of the pole-pieces of said electromagnets and of said armatures being such that the energization of one of said electromagnets causes a rotation of said movable contact-pieces to cause an electrical connection between said movable and said stationary contact-pieces, while an energization of the other electromagnet causes a rotation of said shaft to cause a break in the connection between said contact-pieces.

17. In a device of the class described, the combination with two electromagnets having projecting pole-pieces, of an armature for each of said electromagnets, said armatures being in fixed relation each to the other and each mounted to rotate between the pole-pieces of its associated electromagnet, a plurality of contact-pieces mounted to rotate with said armatures, and a plurality of stationary contact-pieces, the disposition of the pole-pieces of said electromagnets and of said armatures being such that the energization of one of said electromagnets causes a rotation of said armatures and said movable contact-pieces to cause an electrical connection between said movable and said stationary contact-pieces, while an energization of the other electromagnet causes a rotation of said armatures to cause a break in the connection between said contact-pieces.

18. In a device of the class described, the combination with two electromagnets having projecting pole-pieces, of an armature for each of said electromagnets, said armatures being in fixed relation each to the other and each mounted to rotate between the pole-pieces of its associated electromagnet, a plurality of contact-pieces mounted to rotate with said armatures, a plurality of stationary contact-pieces, the disposition of the pole-pieces of said electromagnets and of said armatures being such that the energization of one of said electromagnets causes a rotation of said armatures and said movable contact-pieces to cause an electrical connection between said movable and said stationary contact-pieces, while an energization of the other electromagnet causes a rotation of said armatures to cause a break in the connection between said contact-pieces, and an electromagnet having pole-pieces of opposite polarity, one on either side of said stationary contact-pieces.

19. In a device of the class described, the combination with two electromagnets, of an armature for each electromagnet, each mounted to rotate between the pole-pieces of the associated magnet, a movable contact-piece, a stationary contact-piece, the disposition of the pole-pieces of said electromagnets and of said armatures being such that the energization of one of said electromagnets causes a rotation of its armature to cause an electrical connection between said movable and said stationary contact-piece, while an energization of the other electromagnet causes a rotation of its armature to cause a break in the connection between said contact-pieces, and an electromagnet having pole-pieces of opposite polarity, one on either side of said stationary contact-piece and in close proximity thereto to destroy the arc occasioned upon disengagement of the contact-pieces.

20. In combination, an electric motor, an air-compressor driven thereby, a pneumatic-pressure system supplied by said compressor, two electromagnets, an armature for each of said electromagnets, each rotatably mounted between the pole-pieces of the associated electromagnet, a movable contact-piece, a stationary contact-piece, electric current for the operation of said motor being controlled by said contact-pieces, means whereby a decrease in the pressure in said pneumatic-pressure system to a minimum limit causes the closure of an electric circuit through one of said electromagnets to cause a rotation of its armature to cause an electrical connection between said contact-pieces to close an electric circuit through said motor, and means whereby an increase in the pneumatic pressure to a maximum limit causes the closure of an electric circuit through the other of said electromagnets to cause a reverse rotation of its armature to cause a break in the electrical connection between said contact-pieces to open the electric circuit through said motor.

21. In a device of the class described, the combination with two electromagnets, of an armature for each of said electromagnets, each armature being adapted to rotate between the pole-pieces of its associated electromagnet, a plurality of contact-pieces mounted to rotate with said armatures, a plurality of relatively stationary contact-pieces, spring mechanism associated with said contact-pieces adapted to permit a slight movement of said contact-pieces to maintain a firm rubbing contact with said movable contact-pieces when engaged thereby, and means for adjusting said spring mechanism, the disposition of the pole-piece of said electromagnets and of said armatures being such that the energization of one of said electromagnets causes a rotation of said armatures to cause an electrical connection between said movable and said stationary contact-pieces, while an energization of the other electromagnet causes a reverse rotation of said armatures to cause a break in the connection between said contact-pieces.

22. In a device of the class described, the combination with two electromagnets, of an armature for each of said electromagnets, each armature being adapted to rotate between the pole-pieces of its associated electromagnet, a plurality of contact-pieces mounted to rotate with said armatures, a plurality of relatively stationary contact-pieces, spring mechanism associated with said contact-pieces adapted to permit a slight movement of said contact-pieces to maintain a firm rubbing contact with said movable contact-pieces when engaged thereby, means for adjusting said spring mechanism, the disposition of the pole-piece of said electromagnets and of said armatures being such that the energization of one of said electromagnets causes a rotation of said armatures to cause an electrical connection between said movable and said stationary contact-pieces, while an energization of the other electromagnet causes a reverse rotation of said armatures to cause a break in the connection between said contact-pieces, and an electromagnet having pole-pieces of opposite polarity, one on either side of said relatively stationary contact-pieces.

In witness whereof I hereunto subscribe my name this 23d day of April, A. D. 1903.

WALTER J. RICHARDS.

Witnesses:
    H. E. LASCHÉ,
    F. J. LEWIS.